M. D. MONTGOMERY.
VEHICLE BODY.
APPLICATION FILED OCT. 28, 1916.

1,272,076.

Patented July 9, 1918.
2 SHEETS—SHEET 1.

Martin D. Montgomery, INVENTOR

WITNESSES

BY

ATTORNEY

M. D. MONTGOMERY.
VEHICLE BODY.
APPLICATION FILED OCT. 28, 1916.
1,272,076.
Patented July 9, 1918.
2 SHEETS—SHEET 2.
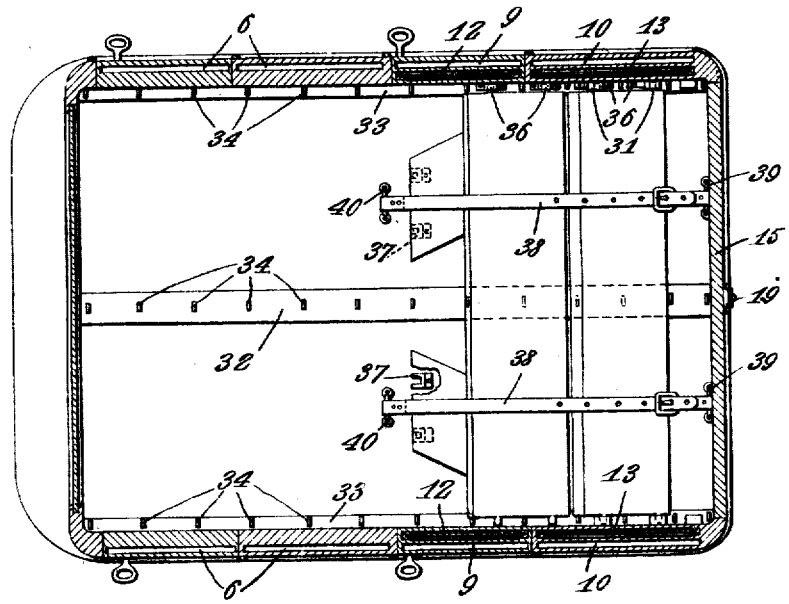
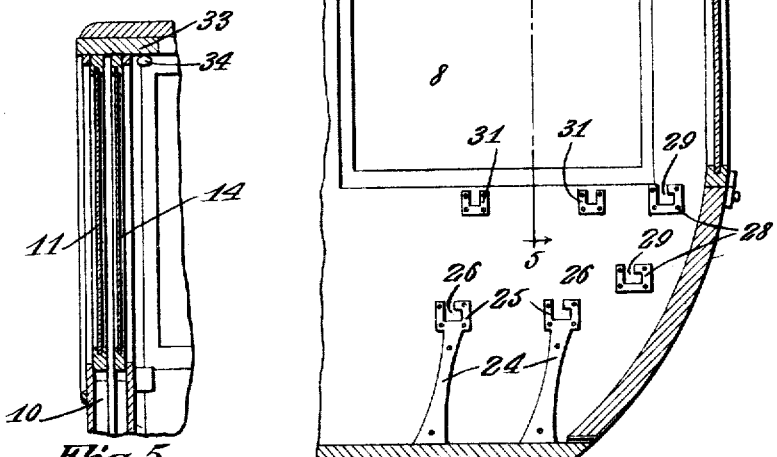
Martin D. Montgomery, INVENTOR
WITNESSES
John M. Dobie
Wm Zearman
BY Richard Bowen,
ATTORNEY

UNITED STATES PATENT OFFICE.

MARLIN D. MONTGOMERY, OF CHICAGO, ILLINOIS.

VEHICLE-BODY.

1,272,076.  Specification of Letters Patent.  Patented July 9, 1918.

Application filed October 28, 1916. Serial No. 128,309.

*To all whom it may concern:*

Be it known that I, MARLIN D. MONTGOMERY, a citizen of the United States, residing at Chicago, in the county of Cook and State of Illinois, have invented certain new and useful Improvements in Vehicle-Bodies, of which the following is a specification.

This invention has relation to motor vehicles, and has for its object to provide a car body of a construction to permit the use thereof as a commercial body, or at other times as a passenger car body.

Another object of the invention is to provide a car body having the above named characteristics and means whereby when the car body is employed in a commercial capacity, suitable advertising placards may be displayed.

A still further object of the invention is to provide a car body having removable seats and means for supporting the same when the car body is used for carrying passengers, and means whereby the seats may be supported out of the way when the car body is used in a commercial capacity, to provide as much space within the body for the reception of merchandise as possible.

In addition to the foregoing my invention comprehends improvements in the details of construction and arrangement of the parts, to be hereinafter more fully described, and particularly pointed out in the appended claims.

In the accompanying drawings in which similar and corresponding parts are designated by the same characters of reference throughout the several views in which they appear:

Fig. 3, is a horizontal sectional view taken on the line 3—3 of the preceding figure.

Fig. 4, is a detail view on an enlarged scale illustrating the supports for supporting the detachable seats, and Fig. 5, is a detail vertical section taken on the line 5—5 of Fig. 4.

Figure 1:
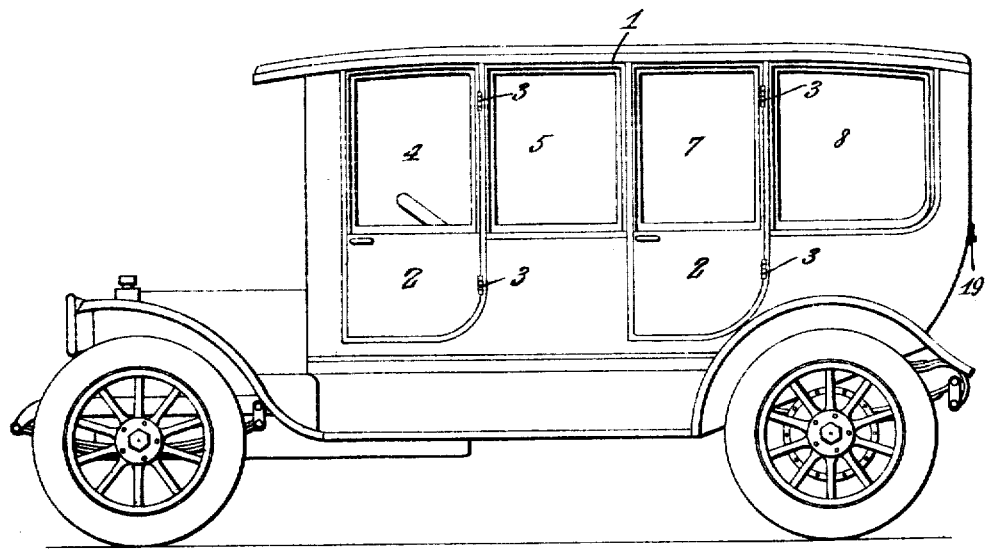
Figure 1 is a view in side elevation of a motor vehicle embodying a car body constructed in the manner of my invention.
Figure 2:
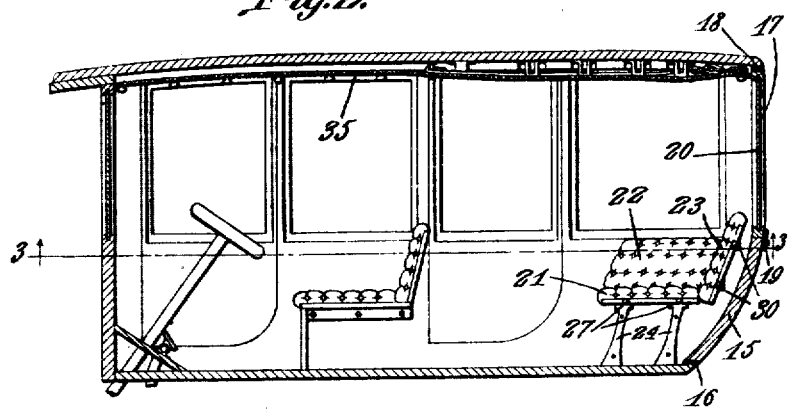
Fig. 2, is a vertical sectional view taken in a longitudinal plane through the car body illustrating its use in a passenger carrying capacity.

With reference to the drawings, 1 indicates generally the car body of my invention, presenting the outward appearance of a limousine, having side doors 2 hingedly supported at 3. A set of doors are provided at opposite sides of the car adjacent the forward portion thereof to permit access to the forward compartment; a second set of doors is provided adjacent the rear of the car to provide access to the rear seat. The forward doors are provided with window openings 4, and the next adjacent rear panel is provided with a window opening indicated at 5. In each instance, the doors and panels are formed with recesses 6 designed to receive the vertical sliding windows, which when lowered are hidden within the walls of the car body.

The rear doors and adjacent panels are also formed with window openings indicated at 7 and 8 respectively, and also recesses 9 and 10 respectively for the reception of windows indicated at 11. The windows are thus permitted to be lowered into the recess 10 within the walls of the car body when the window openings are to be exposed, or said windows may be raised as indicated in Fig. 5. The rear doors, and following panel sections are exact duplicates in this respect. Adjacent the recesses 9 and 10, similar recesses 12 and 13 are provided for the reception of vertically sliding placards 14, which when the car body is used in the commercial capacity, may be moved up and exposed behind the windows to give the car body the resemblance of a delivery car. When the car body is used for carrying passengers however, these placards are designed to be lowered and retained out of view in the recesses 12 and 13 provided therefor.

To gain access to the interior of the car when it is used as a commercial vehicle, the rear of the car body is formed into a lower section 15, hingedly connected to the floor of the car at 16, and an upper section 17 hingedly supported from the roof of the car as at 18. The meeting edges of the sections are secured together through the medium of a suitable lock 19, and when said lock is released, the lower section 15 may be lowered to expose the interior of the car body, the upper section 18 also may be swung back to provide an even larger entrance. If desired, the section 17 may be formed with an opening to receive a transparent pane 20.

To convert the commercial car body into a passenger carrying body, a rear seat is provided which is formed into a seat section proper indicated at 21, end members 22, and a back rest 23. The seat sections may be suitably upholstered.

The seat-portion 21 is supported upon spaced standards 24 secured to the inner side walls of the car body, said standards being provided at their upper ends with enlargements 25 having formed therein substantially L-shaped recesses 26. These standards are designed to form a permanent part of the car body, and while they are useful only when supporting the seat, nevertheless may be permitted to be retained within the body when the same is used as a commercial vehicle without interfering with the storage of merchandise within the car. The seat section 21, is provided at opposite ends with lugs 27 which may be seated within the L-shaped notches 26 of the standard thereby removably supporting the seat. For supporting the back rest, vertically spaced pockets 28 are secured to the interior side walls of the car body in a proper location, and are also formed with substantially L-shaped recesses 29 to receive therein lugs 30 provided at the opposite ends of the back rest. In a similar manner, the end sections 22 of the seats may be supported through the medium of sockets 31 properly located upon the inner walls of the car body, and in a position to receive lugs provided upon the upper horizontal edges of the end seat sections.

To permit the storage of the seat sections out of the way when the car body is used for carrying merchandise, I provide upon the interior surface of the roof of the car, a central longitudinally extending strip 32, and parallel end strips 33. Each strip is provided with a series of spaced turn buttons 34, and a curtain of fabric or flexible material 35, is designed to be secured to the strip, and to that end the fabric is provided at its longitudinal center with a series of uniformly spaced openings in which to receive the turn buttons 34. The margins of the curtains are similarly provided with openings to receive the turn buttons of the strips 33. In this manner, the inner surface of the roof may be entirely hidden from view and the curtain is designed to be extended from side to side of the car body and from the front to the rear. The rear ends of the strips 33 are provided with a series of depending brackets 36, and when the seat sections are to be stored away, the lugs which are normally provided thereupon for engagement in the several standards 24 and the sockets 28 and 31 are employed to support the seat sections upon the brackets 36 and thus are designed to enter recesses provided in the brackets. The seat sections are supported beneath the roof in the manner indicated in Fig. 3 of the drawings. the end sections having specially formed sockets 37 to support the same. To further insure that the seat sections may not be dislodged, straps 38 are stretched from securing members 39 at the rear end of the roof and at opposite ends, to similar securing members 40, provided at an intermediate portion of the car roof, said straps extending beneath the seat sections to more securely bind the same against the roof of the car body. After the seat sections are thus secured in place, the curtain 35 may be folded therebeneath to hide them from view and at the same time protect them from soiling or injury.

Thus it will be seen, that I have provided, for persons of limited means a car body which may be very well employed during the day time to deliver or convey articles of merchandise, and which may furthermore be used at night or other times as a pleasure car, without betraying the fact that the car body was used in a dual capacity.

While I have illustrated and described my invention with some degree of particularity, I realize that in practice various alterations thereover may be made, and I therefore, reserve the right and privilege of changing the form of the details of construction, or otherwise altering the arrangement of the correlated parts without departing from the spirit of the invention or the scope of the appended claims.

Having thus described my invention what I claim as new and desire to secure by Letters Patent is:

1. An inclosed vehicle body having the outward appearance of a limousine, and formed with window openings and windows, collapsible and removable seats therefor, means for supporting the seats out of the way upon the under side of the roof, when the car is to be used in a commercial capacity, and means for displaying advertising placards behind the windows.

2. An inclosed vehicle body having the outward appearance of a limousine, and having glass panels, recesses provided beneath certain of the panels, placards movable in said recesses and adapted to be raised to expose the same behind the panels, collapsible and removable seats, and means for supporting the seats out of the way upon the under side of the roof when the car is to be used in a commercial capacity.

In testimony whereof I affix my signature in presence of two witnesses.

MARLIN D. MONTGOMERY.

Witnesses:
ARTHUR FISHER,
GEORG LEWIS.